(12) United States Patent
Jung et al.

(10) Patent No.: US 9,946,382 B2
(45) Date of Patent: Apr. 17, 2018

(54) TOUCH SENSOR INTEGRATED TYPE DISPLAY DEVICE

(71) Applicant: LG Display Co., Ltd., Seoul (KR)

(72) Inventors: Yongchae Jung, Daegu (KR); Seungpyo Seo, Daegu (KR)

(73) Assignee: LG Display Co., Ltd., Seoul (KR)

( * ) Notice: Subject to any disclaimer, the term of this patent is extended or adjusted under 35 U.S.C. 154(b) by 69 days.

(21) Appl. No.: 14/977,519

(22) Filed: Dec. 21, 2015

(65) Prior Publication Data
US 2016/0188062 A1    Jun. 30, 2016

(30) Foreign Application Priority Data

Dec. 31, 2014  (KR) .................. 10-2014-0195728

(51) Int. Cl.
| | | |
|---|---|---|
| *G06F 3/038* | (2013.01) | |
| *G09G 5/00* | (2006.01) | |
| *G06F 3/041* | (2006.01) | |
| *G09G 3/36* | (2006.01) | |
| *G02F 1/1333* | (2006.01) | |

(Continued)

(52) U.S. Cl.
CPC ........ *G06F 3/0412* (2013.01); *G02F 1/13338* (2013.01); *G06F 1/3206* (2013.01); *G06F 1/3262* (2013.01); *G06F 1/3265* (2013.01); *G06F 1/3287* (2013.01); *G06F 3/044* (2013.01); *G06F 3/0416* (2013.01); *G09G 3/3648* (2013.01); *G09G 3/3688* (2013.01); *G09G 2310/08* (2013.01); *G09G 2330/021* (2013.01); *Y02B 60/1242* (2013.01); *Y02B 60/1282* (2013.01); *Y02B 60/32* (2013.01)

(58) Field of Classification Search
CPC ........ G09G 3/3685–3/3692; G09G 3/00–3/38; G06F 3/0412
See application file for complete search history.

(56) References Cited

U.S. PATENT DOCUMENTS

| | | | |
|---|---|---|---|
| 2010/0110040 A1 | 5/2010 | Kim et al. | |
| 2014/0176625 A1* | 6/2014 | Yoon .................... | G09G 3/3233 345/691 |

(Continued)

FOREIGN PATENT DOCUMENTS

| | | |
|---|---|---|
| EP | 2056282 A2 | 5/2009 |
| EP | 2503435 A2 | 9/2012 |

OTHER PUBLICATIONS

European Extended Search Report, European Application No. 15198202.2, dated May 18, 2016, 9 pages.

*Primary Examiner* — Hang Lin
(74) *Attorney, Agent, or Firm* — Fenwick & West LLP

(57) ABSTRACT

A display device including a panel comprising a plurality of pixels, and a drive circuit configured to apply data voltage to the plurality of pixels through data lines is disclosed. In one embodiment, the drive circuit includes a first circuit block having a first recovery time from a power off state to an operational state of the first circuit block, a second circuit block having a second recovery time from a power off state to an operational state of the second circuit block, the second recovery time shorter than the first recovery time, and a control circuit configured to (i) enable the first circuit block and the second circuit block during a first time period, and to (ii) enable the first circuit block and disable the second circuit block during a second time period.

17 Claims, 7 Drawing Sheets

(51) Int. Cl.
  *G06F 1/32* (2006.01)
  *G06F 3/044* (2006.01)

(56) References Cited

U.S. PATENT DOCUMENTS

2014/0204041 A1    7/2014  Munechika
2015/0325171 A1*  11/2015  Zhou .................... G09G 3/3233
                                                      345/80

* cited by examiner

TOUCH SENSOR INTEGRATED TYPE DISPLAY DEVICE

CROSS-REFERENCE TO RELATED APPLICATION

This application claims the benefit of Korean Patent Application No. 10-2014-0195728 filed on Dec. 31, 2014, which is incorporated herein by reference for all purposes as if fully asset forth herein.

BACKGROUND

Related Field

This document relates to a touch sensor integrated type display device.

Discussion of the Related Art

User interfaces (UI) enable humans (users) to interact with various types of electric or electronic devices so that they can easily control the devices as they want. Typical examples of the user interfaces include keypads, keyboards, mice, on-screen displays (OSD), and remote controllers with an infrared communication capability or radio frequency (RF) communication capability. Recently, user interfaces have been evolving into touch UI, voice recognition UI, 3D UI, etc. Capacitive touchscreens can be used in a variety of applications since they have higher durability and better contrast than conventional resistive touchscreens and allow multi-touch sensing and proximity-touch sensing.

In recent years, there has been a growing demand for in-cell type (hereinafter, in-cell) touch screen integrated-type display devices incorporating elements constituting a touchscreen to make portable terminals such as smartphones, tablet PCs, etc. slimmer. In the in-cell touchscreen integrated type display devices, common electrodes for display are segmented into those for a plurality of touch driving periods and those for a plurality of touch sensing periods so that mutual capacitance occurs between electrodes for the touch driving periods and electrodes for the touch sensing periods. Therefore, the in-cell touchscreen integrated type display devices can detect a touch by measuring a change in mutual capacitance made by the touch.

In the touch sensing periods, the electric potential of electrodes or signal lines other than sensor electrodes must not be changed. Accordingly, during the touch sensing periods, data lines remain at a specific voltage value or their current path to a channel is blocked. A data driver keeps operating when the current path between the channel and the data lines is blocked, as well as when a specific voltage is applied to the data lines. That is, electric power is constantly consumed while the data driver is not actually operating, which results in unnecessary waste of electricity.

SUMMARY

A display device including a panel comprising a plurality of pixels, and a drive circuit configured to apply data voltage to the plurality of pixels through data lines is disclosed. In one or more embodiments, the drive circuit includes a first circuit block having a first recovery time from a power off state to an operational state of the first circuit block, a second circuit block having a second recovery time from a power off state to an operational state of the second circuit block, the second recovery time shorter than the first recovery time, and a control circuit configured to (i) enable the first circuit block and the second circuit block during a first time period, and to (ii) enable the first circuit block and disable the second circuit block during a second time period.

One or more embodiments relate to a method of operating a display device. In one or more embodiments, the method includes enabling a first circuit block to receive digital video data during a first time period and a second time period, the first circuit block having a first recovery time from a power off state to an operation state of the first circuit block, enabling a second circuit block to convert the digital video data into analog video data during the first time period, the second circuit block having a second recovery time from a power off state to an operation state of the second circuit block, the second recovery time shorter than the first recovery time, applying the analog video data to pixels through data lines during the first time period, and disabling the second circuit block during the second time period.

BRIEF DESCRIPTION OF THE DRAWINGS

The accompanying drawings, which are included to provide a further understanding of various embodiments and are incorporated in and constitute a part of this specification, illustrate embodiments and together with the description serve to explain the principles of various embodiments. In the drawings.

DETAILED DESCRIPTION OF THE ILLUSTRATED EMBODIMENTS

Hereinafter, exemplary embodiments will be described in detail with reference to the attached drawings.

Figure 1:
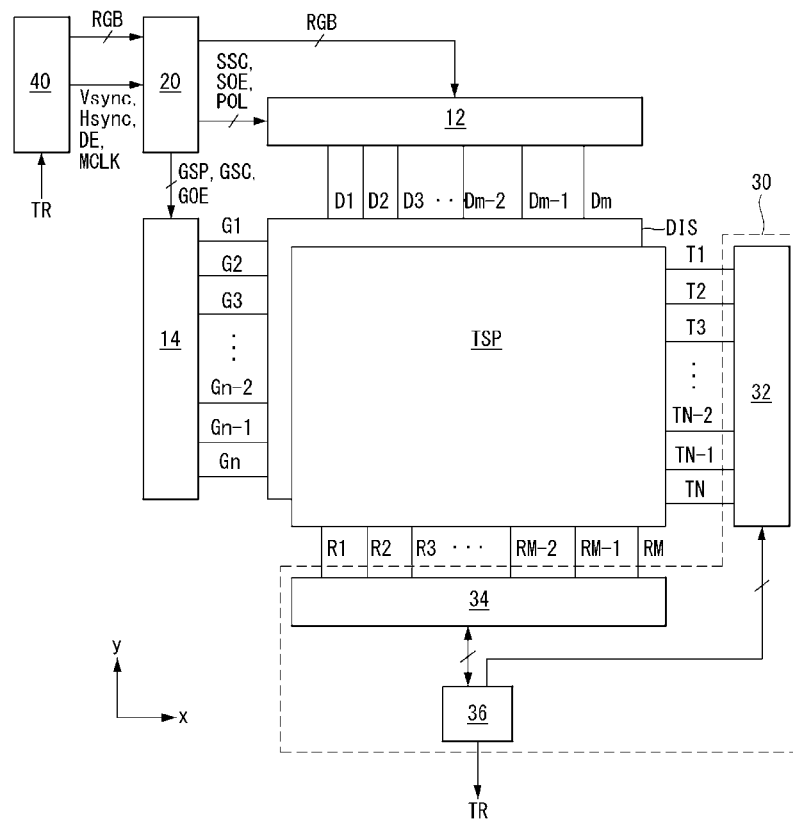
FIG. 1 is a view showing a touch sensor integrated type display device according to an exemplary embodiment.
Figure 2:
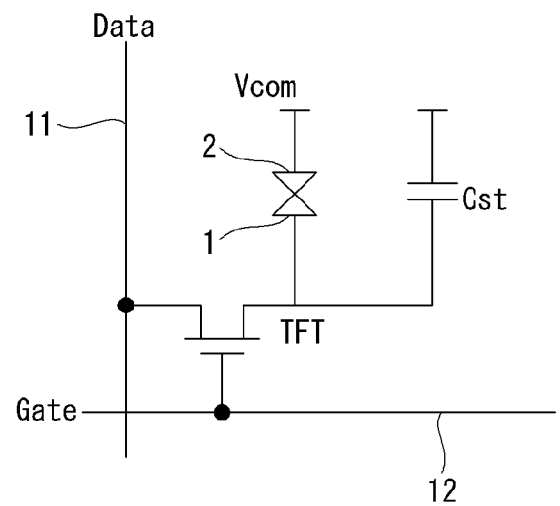
FIG. 2 is an equivalent circuit diagram of a liquid crystal cell.
Figure 3:
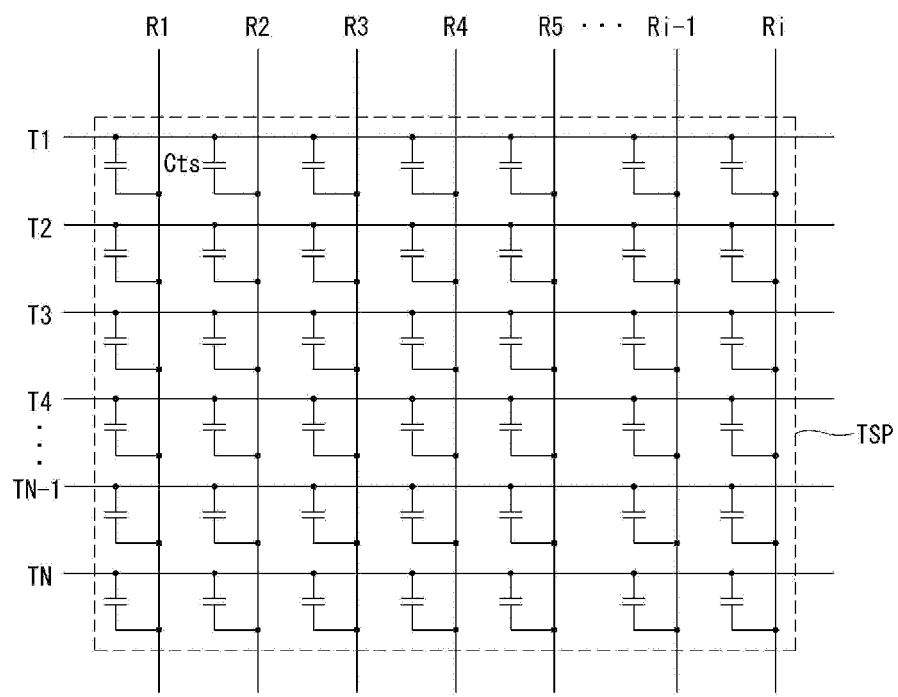
FIG. 3 is an equivalent circuit diagram of a touchscreen.

FIG. 1 is a view showing a touch sensor integrated type display device according to an exemplary embodiment. FIG. 2 is an equivalent circuit diagram of a pixel of the display panel of FIG. 1. FIG. 3 is an equivalent circuit diagram of a touchscreen.

A display device according to an exemplary embodiment comprises a display panel DIS, a display drive circuit, a touchscreen TSP, a touchscreen drive circuit, and so on.

Referring to FIGS. 1 and 2, the display panel DIS comprises a liquid crystal layer formed between two substrates. On the lower substrate of the display panel DIS formed are a plurality of data lines D1 to Dm (m is a natural number), a plurality of gate lines G1 to Gn (n is a natural number) crossing the data lines D1 to Dm, a plurality of thin film transistors (TFTs) formed at the crossings of the data lines D1 to Dm and the gate lines G1 to Gn, a plurality of pixel electrodes 1 for charging liquid crystal cells with a data voltage, and storage capacitors Cst connected to the pixel electrodes 1 to hold the voltage of the liquid crystal cells.

A pixel array on the display panel DIS comprises pixels that are formed in pixel regions defined by the data lines D1 to Dm and the gate lines G1 to Gm. Each pixel may comprise a liquid crystal cell as shown in FIG. 2. The liquid crystal cell of each pixel is driven by an electric field applied by a voltage difference between a data voltage applied to the pixel electrode 1 and a common voltage Vcom applied to a common electrode 2 to adjust the amount of transmission of incident light. The TFTs are turned on by a gate pulse from the gate lines G1 to Gn to supply a data voltage from the data lines D1 to Dm to the pixel electrodes 1 of the liquid crystal cells.

On the upper substrate of the display panel DIS, a black matrix, color filters, etc. may be formed. The lower substrate of the display panel DIS may be implemented in a COT (color filter on TFT) structure. In this case, the black matrix and the color filters may be formed on the lower substrate of the display panel DIS. The common electrode 2 may be formed on either the upper or lower substrate of the display panel DIS.

Polarizers are respectively attached to the upper and lower substrates of the display panel DIS, and an alignment film for setting a pre-tilt angle of liquid crystals is formed on an inner surface contacting the liquid crystals. A column spacer for maintaining a cell gap of the liquid crystal cells is formed between the upper and lower substrates of the display panel DIS.

A backlight unit may be disposed under the back of the display panel DIS. The backlight unit is an edge-type or direct-type backlight unit which illuminates the display panel DIS. The display panel DIS may be implemented in any well-known liquid crystal mode, such as a TN (Twisted Nematic) mode, a VA (Vertical Alignment) mode, an IPS (In-Plane Switching) mode, and an FFS (Fringe Field Switching) mode.

The display drive circuit comprises a data drive circuit 12, a scan drive circuit 14, and a timing controller 20, and transmits a video data voltage for an input image to the pixels on the display panel DIS. The data drive circuit 12 converts digital video data RGB input from the timing controller 20 to an analog positive/negative gamma compensation voltage to output a data voltage. The data voltage output from the data drive circuit 12 is supplied to the data lines D1 to Dm. The scan drive circuit 14 sequentially supplies a gate pulse (or scan pulse) synchronous with the data voltage to select lines on the display panel DIS to which the data voltage is written. In response to the scan pulse, the pixels on the display panel DIS are charged with the data voltage input from the data drive circuit 12 during a high logic period of a horizontal synchronization signal Hsync, and the data voltage is held during a low logic period of the horizontal synchronization signal Hsync.

The timing controller 20 receives timing signals such as a vertical synchronization signal Vsync, a horizontal synchronization signal Hsync, a data enable signal DE, and a main clock MCLK from a host system 40 to synchronize the operation timings of the data drive circuit 12 and scan drive circuit 14 with each other. The vertical synchronization signal Vsync is a signal for defining 1 frame period. The horizontal synchronization signal Hsync defines 1 horizontal period to write data to the pixels of one line in the pixel array of the display panel DIS. 1 horizontal period may be calculated by dividing 1 frame period by the number of lines on the display panel DIS. One cycle of the horizontal synchronization signal Hsync is set to 1 horizontal period. The data enable signal DE defines an effective data input period, and one cycle of the data enable signal DE is set to 1 horizontal period, like the horizontal synchronization signal Hsync. Pulses of the data enable signal DE are generated in synchronization with one line of data, not during a vertical blank VB, but only when effective data is input. The vertical blank VB is the time between an Ith frame period (I is a positive integer) and an (I+1)th frame period, during which no data is input. The main clock signal MCLK is synchronized with each bit of digital video data.

The timing controller 20 generates scan timing control signals for controlling the operation timing of the scan drive circuit 14 and data timing control signals for controlling the operation timing of the data drive circuit 12. The scan timing control signals comprise a gate start pulse GSP, a gate shift clock, a gate output enable signal GOE, etc. The data timing control signals comprise a source sampling clock SSC, a polarity control signal POL, a source output enable signal SOE, etc.

As shown in FIG. 3, the touchscreen TSP comprises Tx lines T1 to TN (N is a positive integer less than n), Rx lines R1 to RM (M is a positive integer less than m) crossing the Tx lines T1 to TN, and (M×N) touch sensors Cts formed at the crossings of the Tx lines T1 to TN and the Rx lines R1 to RM. Each touch sensor Cts comprises mutual capacitance.

Figure 4:
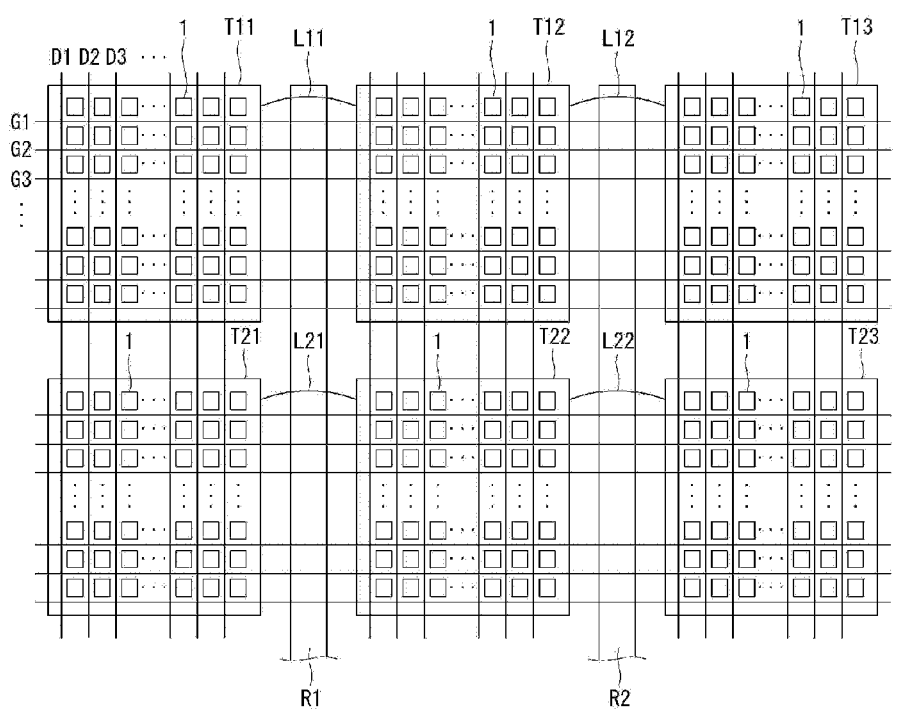
FIG. 4 is a view showing a driving electrode array structure of an in-cell type touchscreen.

FIG. 4 is an enlarged top plan view of Tx electrodes and Rx electrodes on an in-cell type touchscreen TSP. The in-cell type touchscreen TSP will be described in more detail with reference to FIG. 4.

Each Tx line comprises transparent Tx channel electrodes T11 to T13 and T21 to T23 that are connected in a transverse direction (x-axis of FIG. 1) of the display panel DIS via link patterns L11 to L22. The first Tx line T1 comprises the transparent Tx channel electrodes T11 to T13 connected in the transverse direction via the link patterns L11 and L12. The second Tx line T2 comprises the transparent Tx channel electrodes T21 to T23 connected in the transverse direction via the link patterns L21 and L22. Each of the transparent Tx channel electrodes T11 to T23 is larger in size than the pixels, and overlaps multiple pixels. Each of the transparent Tx channel electrodes T11 to T23 overlaps the pixel electrodes 1, with an insulation layer between them. Each of the transparent Tx channel electrodes T11 to T23 may be formed of a transparent conductive material such as indium tin oxide (ITO). The link patterns L11 to L22 run across the Rx lines R1 and R2, and electrically connect the transparent Tx channel electrodes T11 to T23 neighboring in the transverse direction (or horizontal direction). The link patterns L11 to L22 may overlap the Rx lines R1 and R2, with the insulation layer between them. The link patterns L11 to L22 may be formed of metal with high electrical conductivity, for example, aluminum (Al) metal, molybdenum (Mo), chrome (Cr), copper (Cu), or silver (Ag), or a transparent conductive material.

The Rx lines R1 and R2 are formed in a longitudinal direction (y-axis of FIG. 1) of the display panel DIS to cross the Tx lines at right angles. The Rx lines R1 and R2 may be formed of a transparent conductive material such as ITO. Each of the Rx lines R1 and R2 may overlap multiple pixels (not shown).

Figure 7:
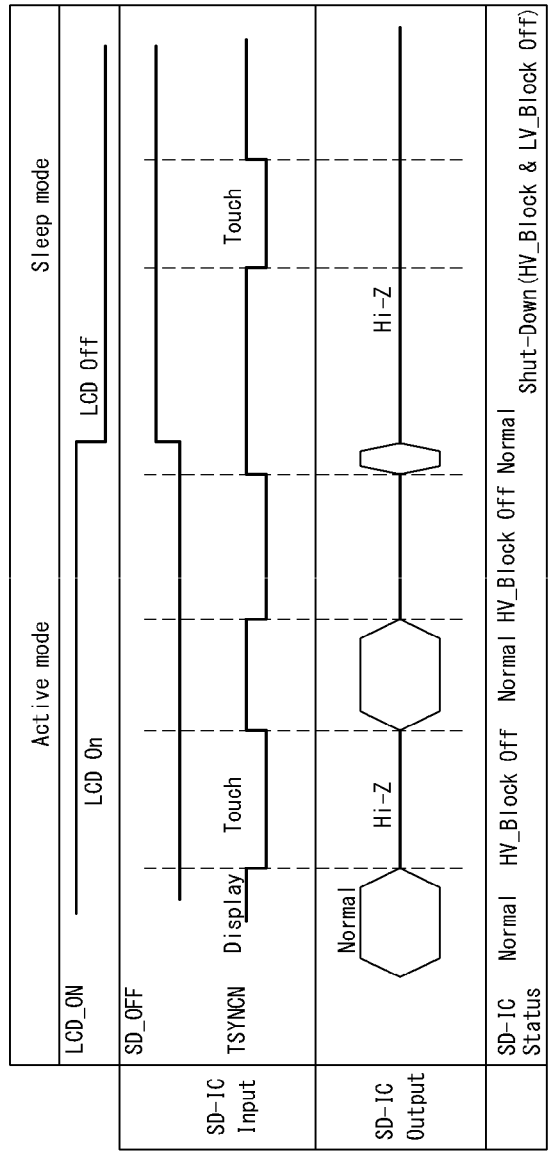
FIG. 7 is a view showing a control method for a source drive IC according to an exemplary embodiment.

The touchscreen drive circuit 30 applies a Tx drive signal to the Tx lines T1 to TN in every low logic period of the horizontal synchronization signal Hsync and senses the voltage of the touch sensors Cts through the Rx lines R1 to RM. As shown in FIG. 7, a low logic period of the horizontal synchronization signal Hsync comprises a vertical blank VB and a horizontal blank HB. As stated above, the vertical blank VB is the time between neighboring frame periods, during which no data is input. The horizontal blank HB is the time between neighboring lines on the pixel array of the display panel DIS, during which no data is written to the pixels. The horizontal blank HB equals the time between consecutive gate pulses.

The touchscreen drive circuit 30 comprises a Tx drive circuit 32, an Rx drive circuit 34, and a touchscreen controller 36 (hereinafter, 'TSP controller').

The Tx drive circuit 32 selects a Tx channel through which it outputs a Tx drive signal, in response to a Tx setup signal input from the TSP controller 36, and applies the Tx drive signal to the Tx lines T1 to TN connected to the selected Tx channel. The Tx lines T1 to TN are charged during a high voltage period of the Tx drive signal to supply electric charges to the touch sensors Cts, and are discharged during a low voltage period of the Tx drive signal. The Tx drive signal may be continually supplied N times (N is a positive integer equal to or greater than 2) to the Tx lines T1 to TN through the Rx lines R1 to RM so that a voltage value of the touch sensors Cts is accumulated in an integrator within the Rx drive circuit 34.

The Rx drive circuit 34 selects an Rx channel through which it receives the voltage of the touch sensors Cts, in response to an Rx setup signal input from the TSP controller 36. The Rx drive circuit 34 samples the voltage of the touch sensors Cts received through the Rx lines R1 to RM, and accumulates its value in the integrator. Then, the Rx drive circuit 34 converts the voltage value accumulated in the integrator into digital data using an analog-to-digital converter (hereinafter, 'ADC') connected to an output of the integrator, and outputs touch raw data.

The TSP controller 36 generates a Tx setup signal for setting a Tx channel through which the Tx drive circuit 32 outputs a Tx drive signal, and an Rx setup signal for setting an Rx channel through which the Rx drive circuit 34 receives the voltage of the touch sensors Cts, and synchronizes the sensing operation of the Tx drive circuit 32 and the sensing operation of the Rx drive circuit 34 with each other. Also, the TSP controller 36 generates timing control signals for controlling the operation timing of the sampler and integrator of the Rx drive circuit 34 and the operation timing of the ADC.

The TSP controller 36 receives a horizontal synchronization signal Hsync from the host system 40, and drives the Tx drive circuit 32 and the Rx drive circuit 34 during touch sensing periods Ts into which the horizontal synchronization signal Hsync is time-divided. The Tx drive circuit 32 and the Rx drive circuit 34 sense the voltage of the touch sensors during the touch sensing periods Ts allocated within a low logic period of the horizontal synchronization signal Hsync, under control of the TSP controller 36.

The TSP controller 36 executes a predetermined touch detection algorithm to compare touch raw data received from the Rx drive circuit 34 with a predetermined threshold value. If the touch raw data is above the threshold value, the touch detection algorithm determines that the touch raw data is data input from touch sensors at touch (or proximity) locations, and calculates the coordinates of each touch (or proximity) location. Then, the TSP controller 36 transmits touch report data TR to the host system 40 at a touch report rate higher than a display frame rate. The touch report data is created after a touch detection processor 70 detects the presence or absence of a touch on every touch sensor within the touchscreen, and comprises coordinate information of each touch (or proximity) location.

The host system 40 may be implemented as one of the following: a navigation system, a set-top box, a DVD player, a Blu-ray player, a personal computer (PC), a home theater system, a broadcast receiver, and a phone system.

Figure 5:
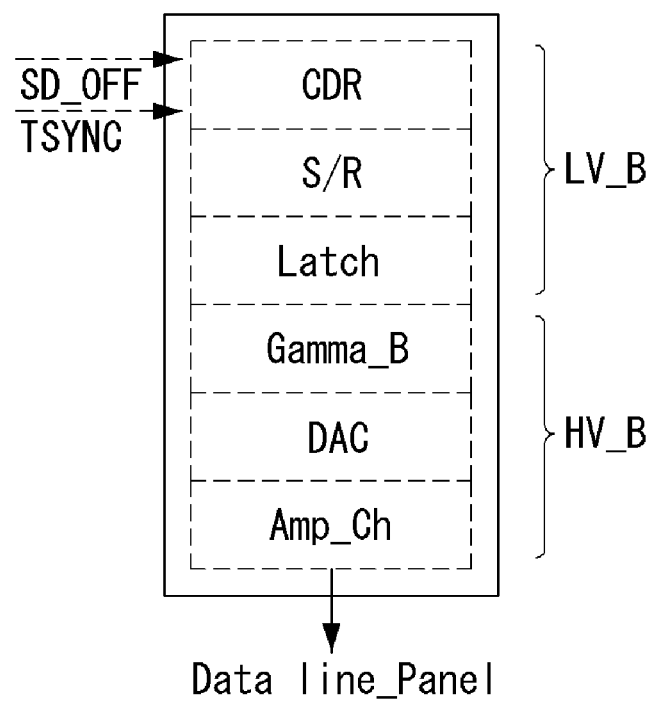
FIGS. 5 and 6 are views showing a source drive IC according to an exemplary embodiment.
Figure 6:
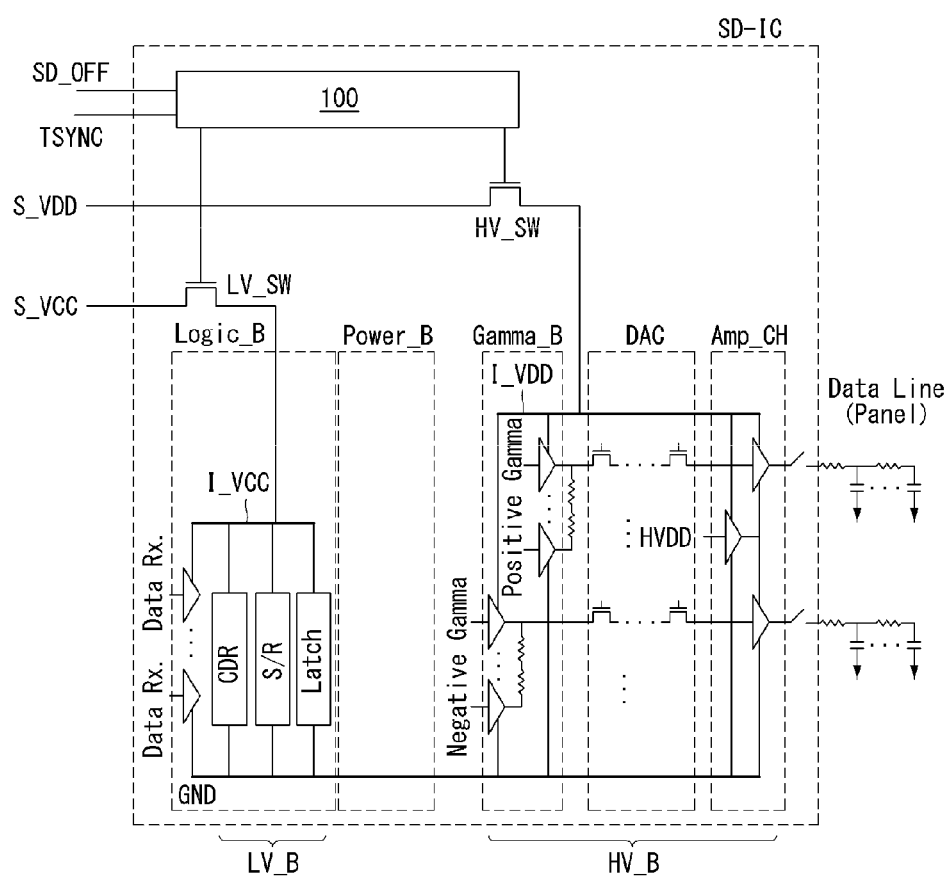

FIGS. 5 and 6 are views showing a configuration of a source drive IC SD-IC.

Referring to FIGS. 5 and 6, a source drive IC SD-IC according to one embodiment comprises a low-voltage driving block LV_B, a high-voltage driving block HV_B, a first switch LV_SW, a second switch HV_SW, and a switch control part 100.

The low-voltage driving block LV_B implements digital signal processing by using a power supply voltage VCC. The power supply voltage VCC is a voltage of about 3.3 V for operating a logic circuit. The low-voltage driving block LV_B comprises a CDR circuit CDR, a shift register S/R, and a latch Latch. The shift register S/R samples RGB digital video data bits of an input image using data control signals SSC and SSP received from the timing controller 20, and provides the sampled bits to the latch Latch. The latch Latch outputs samples and latches digital video data bits according to clocks sequentially received from the shift register S/R, and outputs the latched data simultaneously, in synchronization with the latches Latch of the other source drive ICs, in response to a source output enable signal SOE.

The high-voltage driving block HV_B outputs an analog voltage by using a high voltage VDD. The high-voltage driving block HV_B comprises a digital-to-analog converter DAC and an output part Amp_CH. The digital-to-analog converter DAC converts video data input from the latch Latch into a gamma compensation voltage Gamma to generate an analog video data voltage. The output part Amp_CH provides the data lines with an analog data voltage ADATA output from the digital-to-analog converter DAC during a low logic period of the source output enable signal SOE. The output part Amp_CH may be implemented as an output buffer for outputting a data voltage using a low voltage GND and a high voltage VDD.

The second switch HV_SW selectively switches a current path between a high voltage source S_VDD and a high voltage input I_VDD of the high-voltage driving block HV_B. A gate electrode of the second switch HV_SW is connected to the switch control part 100, its first electrode is connected to the high voltage source S_VDD, and its second electrode is connected to the high voltage input I_VDD of the high-voltage driving block HV_B.

The first switch LV_SW selectively switches a current path between a power supply voltage source S_VCC and a power supply voltage input I_VCC of the low-voltage driving block LV_B. A gate electrode of the first switch LV_SW is connected to the switch control part 100, its first electrode is connected to the power supply voltage source S_VCC, and its second electrode is connected to the power supply voltage input I_VCC of the low-voltage driving block LV_B.

The switch control part 100 receives an OFF signal SD_OFF and a touch synchronization signal TSYNC to control the first switch LV_SW and the second switch HV_SW.

The switch control part 100 controls the first switch LV_SW and the second switch HV_SW under the conditions shown in the following Table 1.

TABLE 1

| SD_OFF | TSYNC | LV_SW | HV_SW | SD-IC Status |
|---|---|---|---|---|
| 0 | 0 | ON | OFF | HV_B OFF |
| 0 | 1 | ON | ON | Normal Operating |
| 1 | 0 | OFF | OFF | LV_B OFF, HV_B OFF |

TABLE 1-continued

| SD_OFF | TSYNC | LV_SW | HV_SW | SD-IC Status |
|---|---|---|---|---|
| 1 | 1 | OFF | OFF | LV_B OFF, HV_B OFF |

If the OFF signal SD_OFF signal is high (or '1'), both the first switch LV_SW and the second switch HV_SW are turned off. Therefore, the first switch LV_SW decouples the power supply voltage source S_VCC and the low-voltage driving block LV_B, hence the low-voltage driving block is disabled. Similarly, the second switch HV_SW decouples the high voltage source S_VDD and the high-voltage driving block HV_B, hence the high-voltage driving block is disabled.

If the OFF signal SD_OFF signal is low (or '0') and the touch synchronization signal TSYNC is low (or '0'), the first switch LV_SW is turned on and the second switch HV_SW is turned off. Therefore, the first switch LV_SW couples the power supply voltage source S_VCC and the low-voltage driving block LV_B, hence the low-voltage driving block is enabled. The second switch HV_SW decouples the high voltage source S_VDD and the high-voltage driving block HV_B, hence the high-voltage driving block is disabled.

If the OFF signal SD_OFF signal is low (or '0') and the touch synchronization signal TSYNC is high (or '1'), both the first switch LV_SW and the second switch HV_SW are turned on. Therefore, the first switch LV_SW couples the power supply voltage source S_VCC and the low-voltage driving block LV_B, hence the low-voltage driving block is enabled. Similarly, the second switch HV_SW couples the high voltage source S_VDD and the high-voltage driving block HV_B, hence the high-voltage driving block is enabled.

FIG. 7 is a timing diagram showing an operation of a source drive IC SD-IC based on Table 1. Referring to Table 1 and FIG. 7, the operation of the source drive IC SD-IC based on the OFF signal SD_OFF and the touch synchronization signal TSYNC will be discussed below.

The timing controller 20 outputs an OFF signal SD_OFF with a phase opposite to that of an ON signal LCD_ON to the source drive IC SD-IC. That is, the timing controller 20 outputs the OFF signal SD_OFF to the source drive IC SD-IC during active mode. Also, during the active mode, the timing controller 20 outputs, to the source drive IC SD-IC, a touch synchronization signal TSYNC for distinguishing between image display periods Display and touch sensing periods Touch. The touch synchronization signal TSYNC is held at low level during the touch sensing periods Touch and at high level during the image display periods Display.

If the OFF signal SD_OFF is at high level, the switch control part 100 turns off the first switch LV_SW and the second switch HV_SW. When the first switch LV_SW is turned off, the low-voltage driving block LV_B is disconnected from the power supply voltage source S_VCC, and the low-voltage driving block LV_B is disabled. When the second switch HV_SW is turned off, the high-voltage driving block HV_B is disconnected from the high voltage source S_VDD, and the high-voltage driving block HV_B is disabled. That is, neither the low-voltage driving block LV_B nor the high-voltage driving block HV_B operates during sleep mode. As such, the exemplary embodiment can reduce power consumption since the operation of the source drive IC SD-IC is interrupted during the sleep mode.

While the OFF signal SD_OFF is at low level, if the touch synchronization signal TSYNC is low level, the switch control part 100 turns on the first switch LV_SW and turns off the second switch HV_SW. That is, the high-voltage driving block HV_B is interrupted during the touch sensing periods Touch of the active mode. When the high-voltage driving block HV_B is not operating (or disabled), no voltage is output from a channel to the data lines. By interrupting the operation of the high-voltage driving block HV_B, high-impedance mode (Hi-Z mode) effect can be expected, and sensing operations can be performed stably during the touch sensing periods Touch. Consequently, various embodiments disclosed herein allow for an increase in power consumption and stable sensing operations by interrupting the operation of the high-voltage driving block HV_B that consumes large amounts of power during the touch sensing periods Touch.

The normal operation of the low-voltage driving block LV_B during the touch sensing periods Touch without interruption is related to the recovery time of the source drive IC SD-IC.

The recovery time of the source drive IC SD-IC is the time for the source drive IC SD-IC to resume normal operation from interrupted state.

The recovery time will be explained below.

Figure 8:
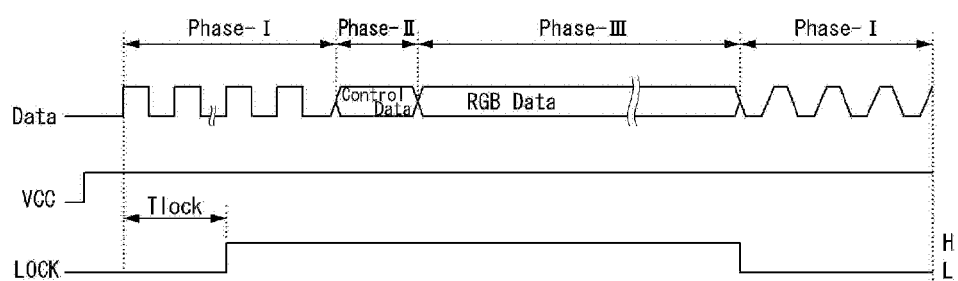
FIG. 8 is a view showing an example of a clock recovery sequence.

The CDR circuit CDR generates (number of RGB bits of video data×2) internal clocks by inputting an EPI clock into a clock recovery circuit. The clock recovery circuit uses a phase locked loop (hereinafter, 'PLL') or a delay locked loop (hereinafter, 'DLL') to output internal clocks and a mask signal and generate a lock signal LOCK. In the operation of the clock recovery circuit of the CDR circuit CDR, a certain amount of time is needed for clock synchronization, which is defined as Tlock (Power on to DLL Lock Time), as shown in FIG. 8. During the 'Tlock' period, the CDR circuit CDR of the source drive IC SD-IC checks whether it is synchronized with an input clock, transmits feedback signal to the timing controller 20, and then receives normal data RGB data from the timing controller 20.

As stated above, a signal feedback time is needed for the CDR circuit CDR to perform clock synchronization with the source control signal SSC and check whether clock synchronization with the source control signal SSC is done. Thus, it takes a relatively long time before normal operation is resumed. When the low-voltage driving block LV_B comprising the CDR circuit CDR is turned off during the touch sensing periods Touch of the active mode in which the image display periods Display and the touch sensing periods Touch keep alternating, transitions to the image display periods become slow due to the recovery time of the CDR circuit CDR. Accordingly, in one embodiment, the low-voltage driving block LV_B, which may have a relatively long period of recovery time, operates normally during the active mode in which images are displayed at intervals.

In contrast, the high-voltage driving block HV_B may have a relatively short period of recovery time because only rising and falling times of a buffer's analog voltage are needed as the recovery time in the process of analog voltage output. Accordingly, power consumption can be reduced by not operating the high-voltage driving block HV_B during the touch sensing periods Touch.

While the OFF signal SD_OFF is at low level, if the touch synchronization signal TSYNC is high level, the switch control part 100 turns on the first switch LV_SW and the second switch HV_SW. That is, both the low-voltage driving block LV_B and the high-voltage driving block HV_B operate normally during the image display periods Display, thereby displaying an image.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device comprising:
a panel comprising a plurality of pixels; and
a drive circuit configured to receive digital video data, convert the digital video data into data voltage, and apply the data voltage to the plurality of pixels through data lines, the drive circuit comprising:
a first circuit block having a first recovery time from a power off state to an operational state of the first circuit block,
a second circuit block having a second recovery time from a power off state to an operational state of the second circuit block, the second recovery time shorter than the first recovery time, and
a control circuit configured to (i) enable the first circuit block and the second circuit block for at least a same portion of time during a first time period, and to (ii) enable the first circuit block and disable the second circuit block during a second time period, wherein the first time period is a display period and the second time period is a touch sense period.

2. The display device of claim 1, further comprising:
a touch drive circuit configured to sense a touch on the panel during the second time period.

3. The display device of claim 2, wherein an output impedance of the second circuit block is higher in the touch sense period than in the display period to perform touch sensing.

4. The display device of claim 1, wherein the control circuit is further configured to disable the first circuit block and the second circuit block during a third time period.

5. The display device of claim 1, further comprising a first switch between the first circuit block and a first power supply voltage, and a second switch between the second circuit block and a second power supply voltage.

6. The display device of claim 5, wherein the first switch is configured to (i) couple the first circuit block and the first power supply voltage to enable the first circuit block or (ii) decouple the first switch and the first circuit block to disable the first circuit block, and wherein the second switch is configured to (i) couple the second circuit block and the second power supply voltage to enable the second circuit block or (ii) decouple the second switch and the second circuit block to disable the second circuit block.

7. The display device of claim 1, wherein the first circuit block includes a clock data recovery circuit to receive the digital video data.

8. The display device of claim 1, wherein the second circuit block includes a digital to analog converter to convert the digital video data into the data voltage.

9. The display device of claim 1, wherein the drive circuit is further configured to receive a first signal indicating whether to enable or disable the panel, and a second signal indicating whether the panel to display an image or detect a touch on the panel.

10. The display device of claim 9, wherein the drive circuit is further configured to disable the first circuit block and the second circuit block, responsive to the first signal indicating to disable the panel.

11. The display device of claim 9, wherein the drive circuit is further configured to enable the first circuit block and the second circuit block, responsive to the first signal indicating to enable the panel and the second signal indicating to display the image.

12. The display device of claim 9, wherein the drive circuit is further configured to enable the first circuit block and disable the second circuit block, responsive to the first signal indicating to enable the panel and the second signal indicating to sense the touch on the panel.

13. The display device of claim 1, further comprising an in-cell type touch screen.

14. A method of operating a display device, the method comprising:
enabling a first circuit block to receive digital video data during a first time period and a second time period, the first circuit block having a first recovery time from a power off state to an operation state of the first circuit block;
enabling a second circuit block to convert the digital video data into analog video data for at least a same portion of time during the first time period, the second circuit block having a second recovery time from a power off state to an operation state of the second circuit block, the second recovery time shorter than the first recovery time;
applying the analog video data to pixels through data lines during the first time period;
displaying an image on a panel of the display device during the first time period;
disabling the second circuit block during the second time period; and
sensing a touch on the panel during the second time period.

15. The method of claim 14, disabling the first circuit block and the second circuit block during a third time period.

16. The method of claim 14, further comprising:
supplying a first power supply voltage to the first circuit block to enable the first circuit block during the first time period and the second time period; and
supplying a second power supply voltage to the second circuit block to enable the second circuit block during the first time period, a voltage level of the second power supply voltage higher than a voltage level of the first power supply voltage.

17. The method of claim 16, further comprising:
cutting off the first power supply voltage to the first circuit block to disable the first circuit block during a third time period; and
cutting off the second power supply voltage to the second circuit block to disable the second circuit block during the second time period and the third time period.

* * * * *